March 23, 1965 A. S. KASULIS 3,174,343
PNEUMATIC EXERCISER WITH PRESSURE GAUGE
Filed Oct. 23, 1962 3 Sheets-Sheet 1
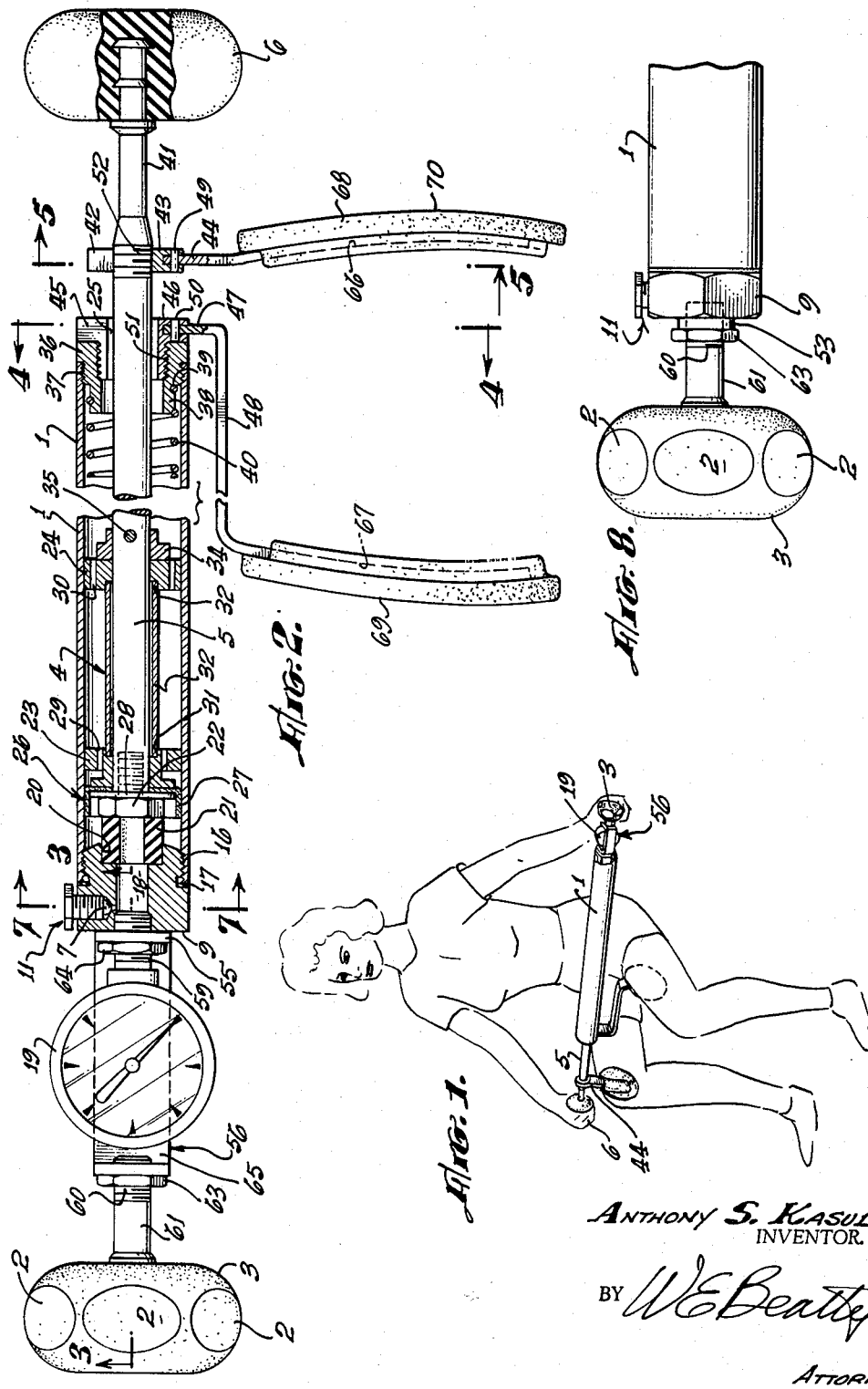
Anthony S. Kasulis,
INVENTOR.
BY W. E. Beatty
ATTORNEY.

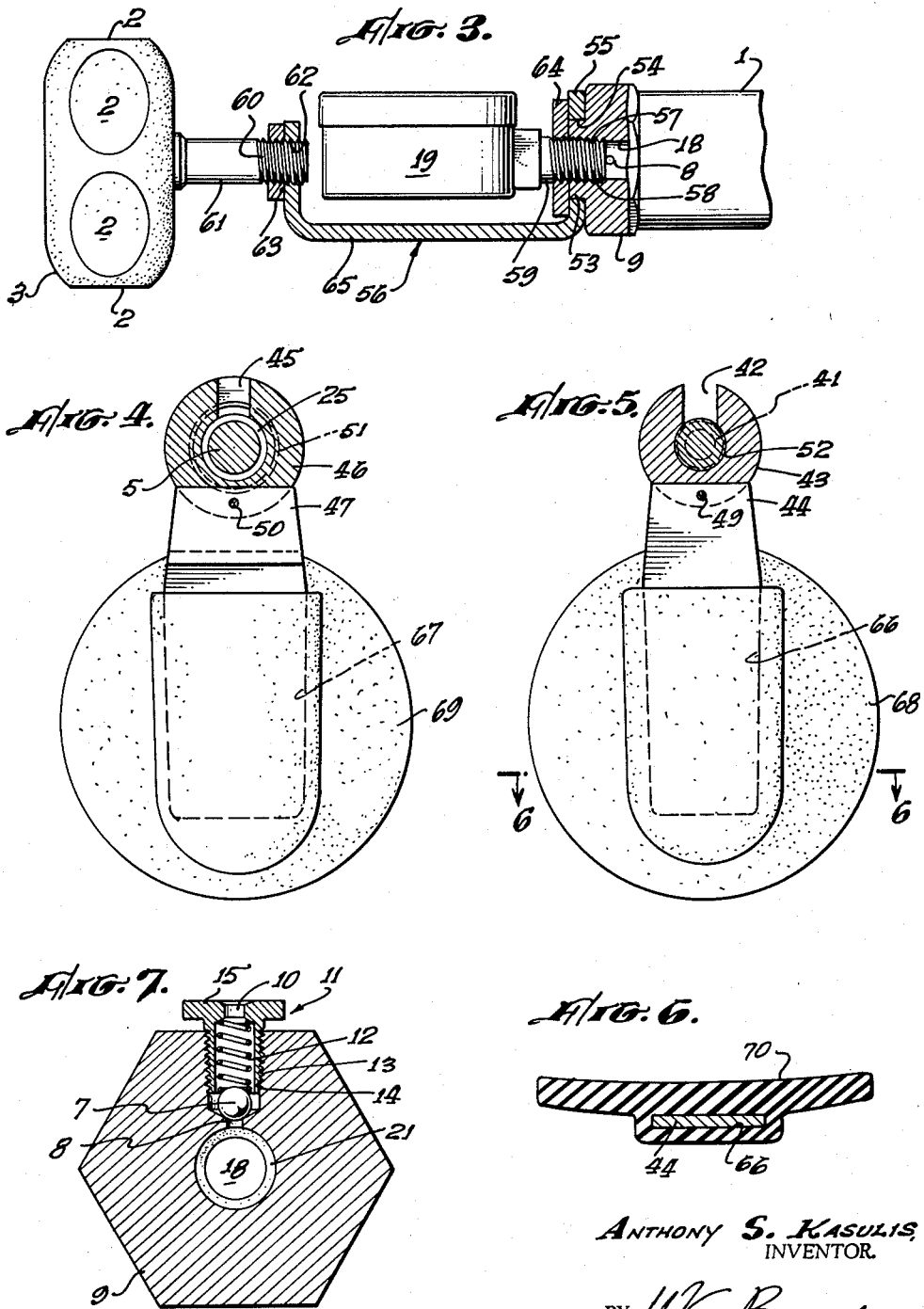

March 23, 1965   A. S. KASULIS   3,174,343
PNEUMATIC EXERCISER WITH PRESSURE GAUGE
Filed Oct. 23, 1962   3 Sheets-Sheet 3

Anthony S. Kasulis,
INVENTOR.

BY W. E. Beatty
ATTORNEY

United States Patent Office 3,174,343
Patented Mar. 23, 1965

3,174,343
PNEUMATIC EXERCISER WITH PRESSURE
GAUGE
Anthony S. Kasulis, 8619¼ W. 3rd St.,
Los Angeles 48, Calif.
Filed Oct. 23, 1962, Ser. No. 232,522
2 Claims. (Cl. 73—379)

The invention relates to improvements in an exercising device disclosed and claimed in copending application S.N. 201,864, filed June 12, 1962, referred to as Case A. An object of the present invention is to provide an improved device of this type to be operated by the hands, or by the legs, wherein the user works against air pressure instead of springs or weights, for exercising various muscles.

In the example shown, the exercising device is provided at its opposite ends with handles to be held in the hands of the user, and with leg operating means to be operated by the legs while supporting the device with the handles. In another form, the exercising device is provided with leg operating means to be secured to the legs, the use of the handles in this case being unnecessary. Means are provided for adjusting the force required to reciprocate the air compressor in the compression stroke, although this force is to some extent under the control of the user who can increase the force of compression by increasing the speed of operation.

As in Case A, the invention provides a device of the type described which is simple and rugged in operation. Hence, the casing at one end is preferably open to the atmosphere, the reciprocating rod having a slide bearing fitting inside the cylinder, which leads to the difficulty that a lubricant may leak out the open end of the casing, this difficulty being overcome by the provision of a "lube" well or trap which serves also as a holder for a cushioning spring.

In Case A, the invention insures that a full charge of air will be admitted into the cylinder at the end of the return stroke without relying on the flexibility of the piston washer to provide leakage. In the present case, this is accomplished by providing air vents through slide bearings for the piston rod.

Further features of the invention are (a) the provision of a rubber cushion on the cylinder head instead of a spring on the piston, (b) a piston rod in one piece instead of the former device, (c) a removable pressure gauge and removable handle whereby the gauge may be sold as an accessory, couplings being provided whereby the handle can be mounted on the cylinder head without the gauge, or the gauge may be mounted on the cylinder head with the handle mounted on the gauge bracket. A further advantage of this feature (c) is that the gauge and its coupling member with external threads are coaxial with the cylinder where it forms an extension of the cylinder and is more convenient to use than in the former case where the gauge extended at an angle to the cylinder head. A still further advantage is that the bracket support for the gauge makes it possible to use a commercial form of gauge which is available on the market and wherein the threaded nipple or gauge is comparatively short.

A further feature is the provision of leg operating means in the form of removable supports, or brackets, laterally extending from the piston rod and from the cylinder, with two forms of covers or removable leg engaging devices fitting thereon. In one form, these leg engaging devices are pads to be loosely engaged by the legs while the exercising device is supported by the handles. In the other form, the device is in the form of a removable pad having a strap for securing the device to the leg, making it unnecessary to use or hold the handles. The advantage in this last case is that the user could exercise the legs while in some position where the handles could not be reached, viz., in a prone position face up or down. The supports or brackets are removable, whereby they and their two forms of covers may be separately provided as accessories for the exercising device.

For further details, reference may be made to the drawings wherein FIG. 1 is a perspective view of an exercising device according to the invention, with the gauge on the device, and with the removable knee brackets on the device, the handles being held by the hands of a user and with the knee brackets between the knees.

FIG. 2 is an enlarged plan or side view partly in a longitudinal sectional view of the device shown in FIG. 1, reversed lengthwise in position.

FIGS. 3, 4, 5 and 7 are sectional views on lines of the corresponding numbers in FIG. 2, looking in the direction of the respective arrows, FIGS. 3 and 4 being enlarged views.

FIGS. 4, 5 and 6 show one form of leg operated device wherein removable pads are provided for the knee brackets.

FIG. 6 is a sectional view on line 6—6 of FIG. 5.

FIG. 8 is a partial plan view of the left hand end of the device as shown in FIG. 2, with the gauge removed and the handle coupled directly to the cylinder head.

Figure 9:
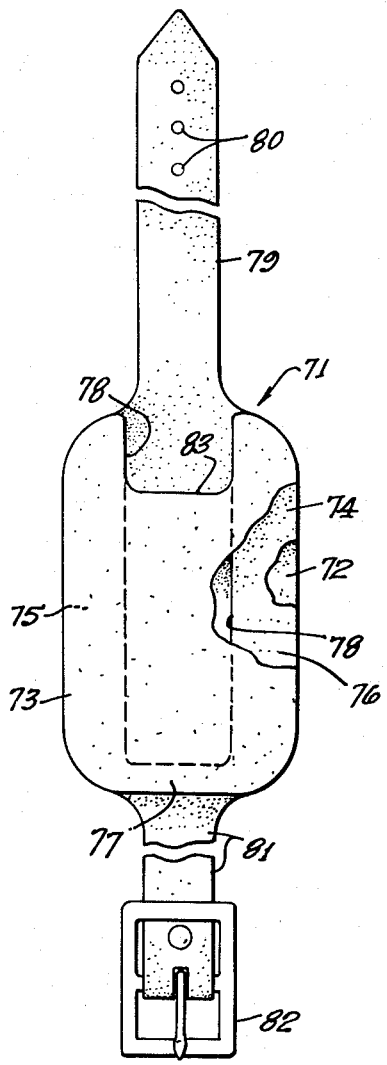
FIG. 9 is a plan view of a strap for encircling the leg of the user, the strap having a pocket for the knee bracket of the preceding figures whereby the device may be employed to exercise the limbs without the necessity of employing handles, as shown.

Referring in detail to the drawings, the exercising device is in the form of an air compressor having a cylindrical casing 1 to the cylinder head 9 of which is fixed a handle or hand grip 3 to be held in one hand of the user, the cylinder 1 having a piston 4 having a one piece piston rod 5 to the outer end of which is fixed another handle or hand grip 6 to be held in the other hand of the user. The handle 3 has several flats indicated at 2 spaced around its periphery to prevent the device from rolling when placed on a table, or the like. The cylinder 1 may be of aluminum and handles 3 and 6 of plastic. In one case the device may be used (a) by holding the handles 3 and 6 in the opposite hands and by forcing the hands towards each other or away from each other, against the air pressure built up in the compressor, (b) by urging the legs towards each other against the air pressure, as shown in FIG. 1, with the use of the removable pads of the leg rests of FIGS. 4, 5, and 6; and (c) by fastening the piston rod and cylinder to the opposite legs of the user by means of leg rests in the form of pads each having a pair of straps like the ones shown in FIGS. 9 and 10, the handles 3 and 6 not being needed. While this pressure is variable by varying the speed of operation, means are provided for varying the force required to operate the piston on the compression stroke. This means is in the form of a ball valve 7, see FIG. 7, which controls a passage having an inlet 8 in the cylinder head 9 and an outlet 10 which leads to the atmosphere.

Outlet 10 is in a spring barrel 11 having spring 12 urging ball 7 to its seat closing inlet 8. Spring barrel 11 has a threaded connection 13 with the threaded bore 14 in head 9, the enlarged head 15 acting as a handle to operate the spring barrel and adjust the tension of spring 12, to adjust the air pressure at which the relief takes place.

The head 9 of the cylindrical casing 1 is held in position by a threaded coupling 16, a suitable packing 17 being provided between head 9 and the end of casing 1. Head 9 has an axial passage 18 which connects with inlet 8 and with pressure gauge 19. Passage 18 is enlarged at its inner end to provide a recess 20 in which is fixed a hollow short piece of rubber hose 21 acting as a cushion for the bolt head 22 at the end of piston rod 5.

Piston rod 5 has spaced bearing guides 23 and 24 which support the piston rod 5 for reciprocating movement, the other end of casing 1 being open, providing a space around piston rod 5 as shown at 25.

Piston rod 5 has a piston 26 having a flexible cup packing 27 held in place against the end of bearing guide 23 by a metal washer 28 under the bolt head 22. Bearing guides 23 and 24 each have a plurality of air ducts as shown at 29 and 30. Bearing guides 23 and 24 have facing recesses 31 and 32 for the opposite ends of a spacer tube 32 which spaces the guides 23 and 24 apart. Guide 24 bears on a collar 34 fixed to rod 5 by a pin 35, the guides 23 and 24, tube 33, washer 28 and cup washer 27 being held under compression between collar 34 and the bolt head 22.

As shown in FIGS. 2, 4 and 5 the end of casing 1 opposite head 9 has a hollow cap 36 mounted at the end of casing 1 with a threaded connection 37. Cap 36 has an inner extension 38 to the outside of which is fixed one end 39 of a cushioning spring 40, the other end of spring 40 being unsupported and extending in the path of bearing guide 24 to cushion the return stroke.

Handles 3 and 6 are suitably fixed to rod 5 by a press fit or otherwise. The outer end of rod 5 has a section 41 of reduced diameter, smaller than the slot 42 in a nut 43 which carries one of the laterally extending leg operating brackets 44, and also smaller than slot 45 in cap 46 removably connected to cap 36 by threads 51, cap 46 carrying the other transversely operating bracket 47, offset toward cylinder head 9 as shown at 48. Bracket 44 is fixed to its nut by a pin 49, or the like, and bracket 47 is similarly fixed to nut 46 by pin 50. The larger diameter or unreduced portion of rod 5 has threads 52 for nut 43 which may be removed by unscrewing nut 43 and moving it outwardly of rod 5 to reduced section 41 which will pass the slot 42, permitting removal of nut 43 and its bracket 44. Thereafter, cap 46 may be unscrewed from threads 51 and moved along rod 5 to reduced section 41 which will pass slot 45, permitting removal of nut 46 and its bracket 47. Nuts 43 and 46 with their brackets may be mounted in position shown in FIG. 2 in an obvious manner by reversing the sequence of steps just described.

As shown in FIG. 3, cylinder head 9 has a raised portion 53 serving as a post which fits an aperture 54 in the inner end 55 of a U shaped bracket 56. The other end of passage 18 has threads 57 mating with either the threads 58 on the nipple 59 of gauge 19 or with the threads 60 on the stem on stub shaft 61 of handle 3. The outer end of bracket 56 has a threaded socket 62 receiving the threads 60, the handle 3 being fixed by a lock nut 63. The inner end of bracket 56 has a lock nut 64 to lock gauge 19 in position with the inner end of bracket 56 clamped against the cylinder head 9. The threaded nipple 59 is coaxial with casing 1, the bracket 56 having a lateral offset as shown at 65 to accommodate the gauge 19 in between and in line with the casing 1 and handle 3.

FIG. 8 shows the handle 3 with its stem 61 mounted directly on the cylinder head 9 without the gauge 19 which can thus be separately provided as an accessory.

As shown in FIGS. 2, 4 and 5, the leg operating devices, or brackets, 44, 47 are in the form of flat posts which removably fit in pockets 66 and 67 respectively cast integral with their respective pads 68 and 69 which cover and extend beyond their respective brackets, each pad being a unitary molding of rubber or similar material. Each pad provides an extended cushioning surface as indicated at 70 for pad 68 in FIG. 6, and as shown this surface may be concave to formfit the inner portion of the leg. The pads 68 and 69 are identical. With the pads 68 and 69 in place as shown in FIGS. 1, 2, 4 and 5, they are in position to be embraced by the opposite legs of the user, with the cylinder 1 extending crosswise of the legs whereby the user can exercise the leg and associated muscles by urging the legs toward each other against the compression in the cylinder 1.

Figure 10:
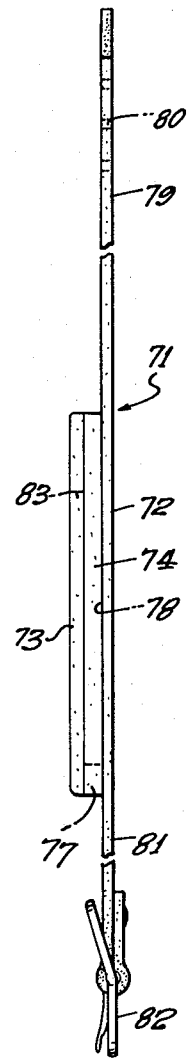
FIG. 10 is a side view of the strap device of FIG. 9.

FIGS. 9 and 10 show a different form of pad 71, or attachment, for the brackets, or posts, 44 and 47 two of these pads being required, one for each of the brackets. In this case, the pad 71 is in the form of a base piece 72 and a cover piece 73 and a spacer 74 extending around the sides 75 and 76 and the bottom 77 to form a pocket 78 fitting and removably receiving the bracket 44 or 47. Pocket 78 has an opening 83 for the bracket. The base piece 72 has oppositely extending strap extensions 79 having holes indicated at 80 and strap extension 81 having a buckle 82. The strap extensions 79 and 81 are long enough to fit around the leg of the user and with a pad as shown in FIGS. 9 and 10 on each bracket 44 and 47 the cylinder 1 may be positively fastened to one leg and the piston rod 5 positively fastened to the other leg of the user.

The pad 71 may be made of three pieces of leather or other flexible material, suitably stitched, cemented or otherwise fastened together, or it may be molded in one piece of rubber, or rubber substitute material.

In the form shown in FIG. 1, the handles are used to operate the device on the return stroke while in FIGS. 9 and 10 the handles may or may not be used to assist the legs in operating the device on both the compression stroke and the return stroke.

I claim:

1. An exercising device comprising an air compressor having a piston, said piston having a piston rod having a laterally extending leg rest for one leg of a user, a cooperating cylindrical casing for said piston, said casing having a laterally extending leg rest opposite said first mentioned rest in position for the other leg of the user, in combination with a handle on said piston rod, a cylinder head for said casing, a removable bracket having inner and outer ends and an intermediate offset portion, a pressure gauge fitting in said offset and having a threaded nipple fitting a threaded socket in said cylinder head, a lock nut holding said gauge and the inner end of said bracket on said cylinder head, the outer end of said bracket having a threaded socket, a handle having a threaded stud fitting either of said sockets, whereby said handle may be mounted on said bracket with said gauge in position on said head, or said handle may be mounted on said head without said gauge.

2. In an exercising device, the combination of a casing having a piston and piston rod with a handle on said piston rod, a cylinder head for said casing, a removable bracket having inner and outer ends and an intermediate offset portion, a pressure gauge fitting in said offset and having a threaded nipple fitting a threaded socket in said cylinder head, a lock nut holding said gauge and the inner end of said bracket on said cylinder head, the outer end of said bracket having a threaded socket, a handle having a threaded stud fitting either of said sockets, whereby said handle may be mounted on said bracket with said gauge in position on said head, or said handle may be mounted on said head without said gauge.

References Cited by the Examiner

UNITED STATES PATENTS

| | | | |
|---|---|---|---|
| 767,008 | 8/04 | Pelletier et al. | 272—79 |
| 2,132,862 | 10/38 | Pilates | 272—83 |
| 2,680,967 | 6/54 | Newman | 73—379 |

RICHARD C. PINKHAM, *Primary Examiner.*